US007055134B2

(12) United States Patent
Schroeder

(10) Patent No.: US 7,055,134 B2
(45) Date of Patent: May 30, 2006

(54) SERVICE PROVIDER INTEGRATION FRAMEWORK IN OBJECT ORIENTED PROGRAMMING ENVIRONMENT

(75) Inventor: Norbert Schroeder, Weinheim (DE)

(73) Assignee: SAP AG, Walldorf (DE)

( * ) Notice: Subject to any disclaimer, the term of this patent is extended or adjusted under 35 U.S.C. 154(b) by 654 days.

(21) Appl. No.: 10/209,281

(22) Filed: Jul. 30, 2002

(65) Prior Publication Data
US 2003/0208583 A1 Nov. 6, 2003

Related U.S. Application Data

(60) Provisional application No. 60/364,551, filed on Mar. 14, 2002, provisional application No. 60/364,970, filed on Mar. 14, 2002.

(51) Int. Cl.
*G06F 9/44* (2006.01)
(52) U.S. Cl. .................... 717/120; 717/108; 717/116
(58) Field of Classification Search ............... 717/101, 717/107–109, 114–122; 707/10, 203
See application file for complete search history.

(56) References Cited

U.S. PATENT DOCUMENTS

| 5,838,973 | A  | * | 11/1998 | Carpenter-Smith et al. . 717/105 |
|-----------|----|---|---------|----------------------------------|
| 6,088,739 | A  | * | 7/2000  | Pugh et al. ................. 719/315 |
| 6,134,552 | A  | * | 10/2000 | Fritz et al. ................... 707/10 |
| 6,226,792 | B1 | * | 5/2001  | Goiffon et al. ............. 717/120 |
| 6,324,619 | B1 | * | 11/2001 | Raverdy et al. ............ 717/120 |
| 6,430,563 | B1 | * | 8/2002  | Fritz et al. .................... 707/10 |
| 6,601,233 | B1 | * | 7/2003  | Underwood ................. 717/102 |
| 6,701,514 | B1 | * | 3/2004  | Haswell et al. ............. 717/115 |
| 6,718,535 | B1 | * | 4/2004  | Underwood ................. 717/101 |
| 6,721,747 | B1 | * | 4/2004  | Lipkin .......................... 707/10 |
| 6,799,184 | B1 | * | 9/2004  | Bhatt et al. ................. 707/102 |
| 6,810,400 | B1 | * | 10/2004 | Kagalwala et al. ......... 707/100 |
| 6,877,153 | B1 | * | 4/2005  | Konnersman ............... 717/100 |

OTHER PUBLICATIONS

Jamil et al, "An object orienetd extension of XML for autonomous web applications", ACM CIKM, pp. 161-168, 2002.*
Diaz et al, "A farmwork focus on configuration modeling and integration with transparent persistence", IEEE IPDPS, pp. 1-8, 2005.*
Demsky et al, "Role based exploration of object oriented programs", ACM ICSE, pp. 313-324, 2002.*
Tamai et al, "An adaptive object model with dynamic role bining", ACM ICSE, pp. 166-175, 2005q.*

* cited by examiner

Primary Examiner—Anil Khatri
(74) Attorney, Agent, or Firm—Fish & Richardson P.C.

(57) ABSTRACT

Methods and data processing apparatus, including computer program products, providing and implementing an integration framework for service providers, where a persistent object identifier object is used to provide a general reference to a persistent object of a service provider. A service provider has a service provider client, a service provider backend, and a service provider repository for storing service provider persistent objects. The service provider provides to its objects the services of storage of persistent objects in the service provider repository; visualization of objects in the service provider client, and access to objects in the service provider backend. The framework has a client framework and a backend framework. The client framework communicates directly with the backend framework, and the backend framework performs non-visual operations on the service provider backend.

20 Claims, 10 Drawing Sheets

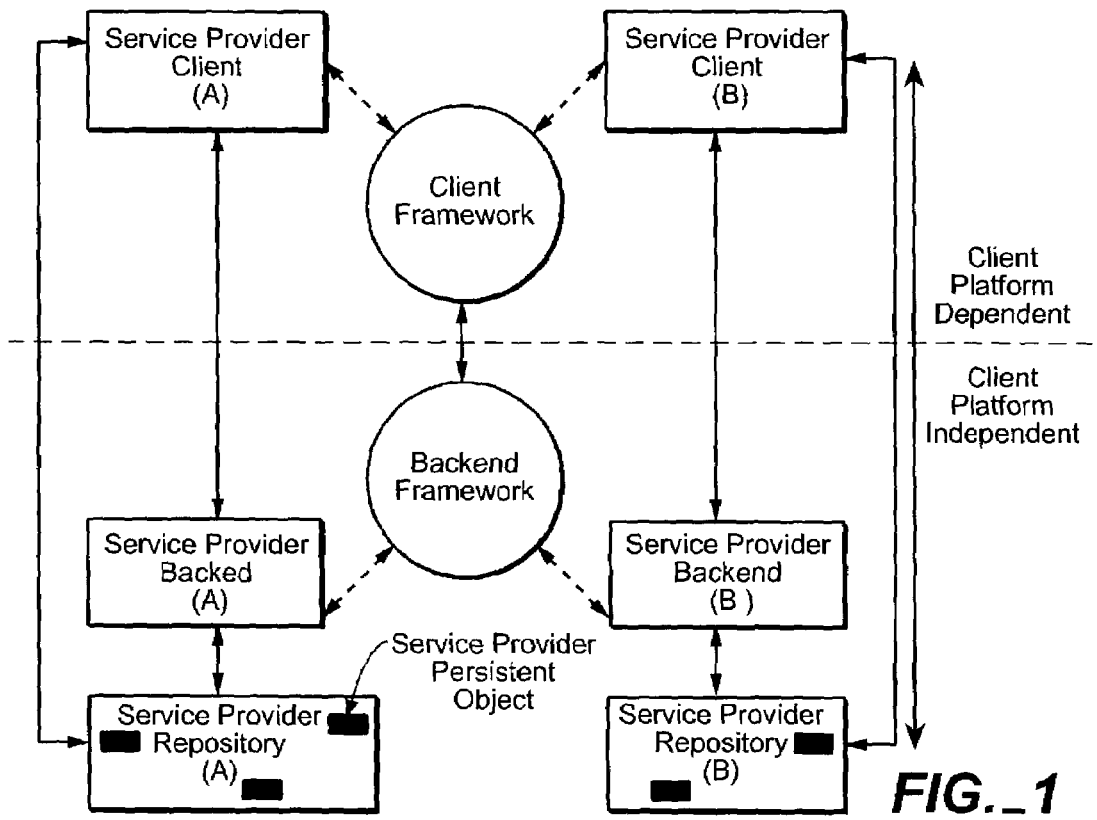
FIG._1
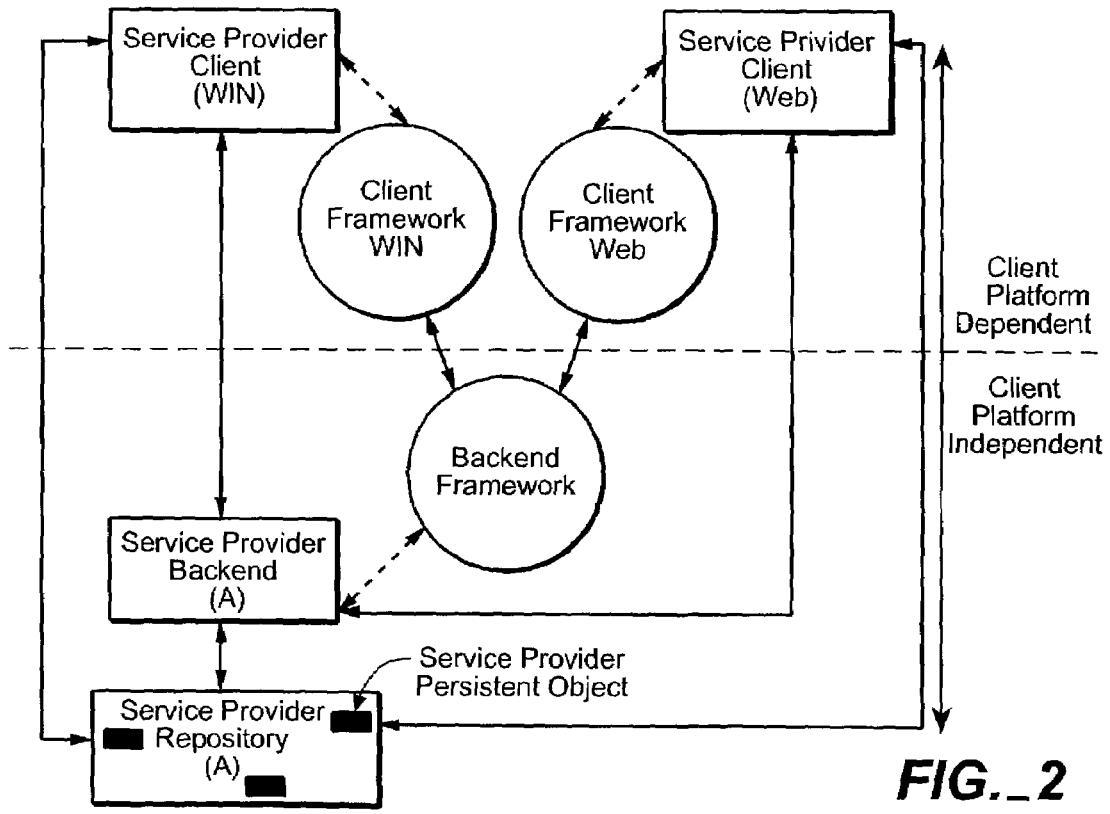
FIG._2

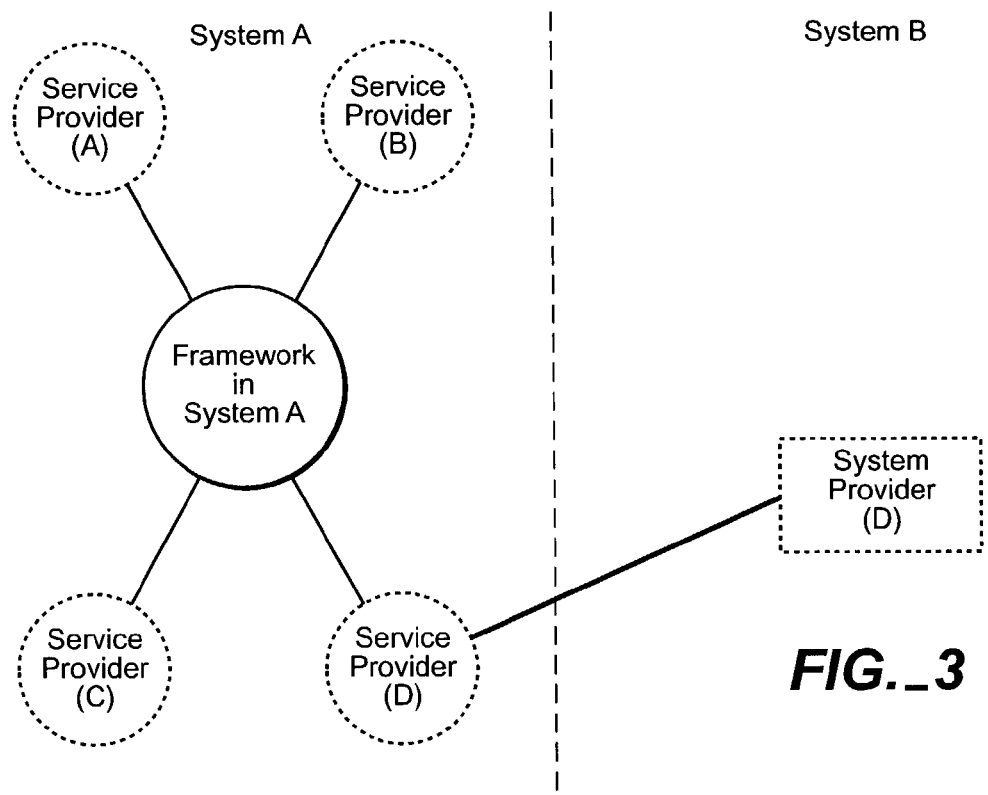
FIG._3
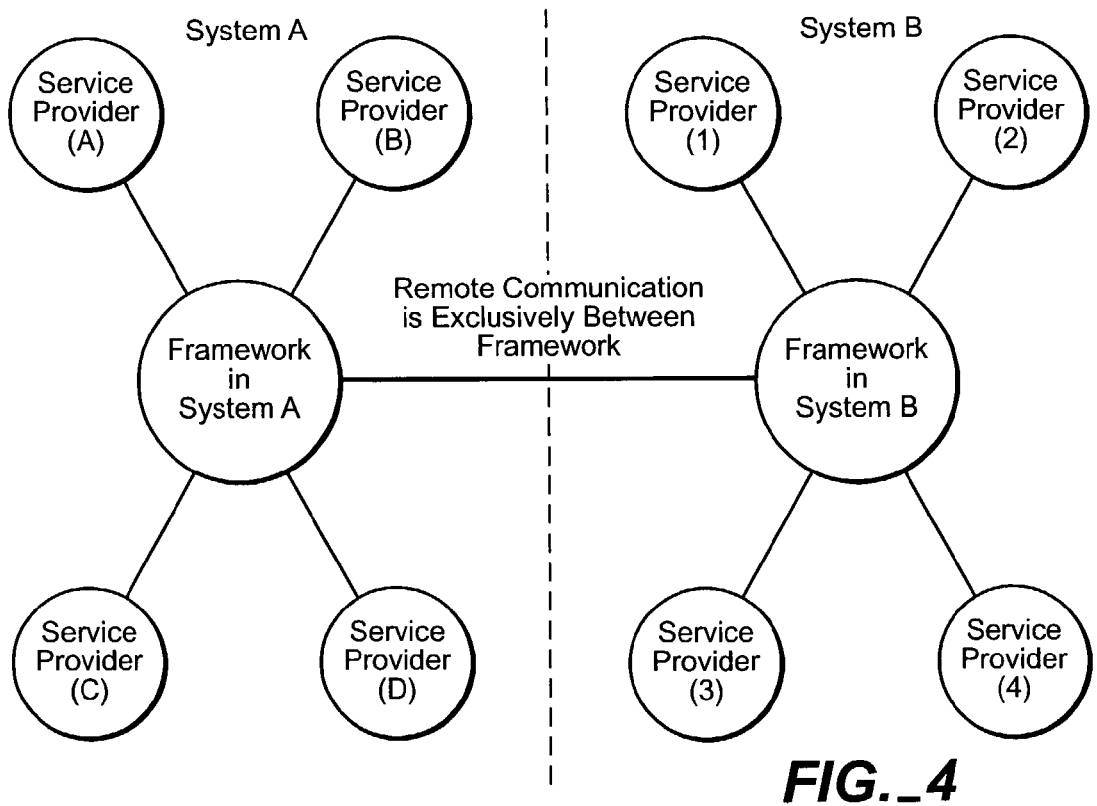
FIG._4

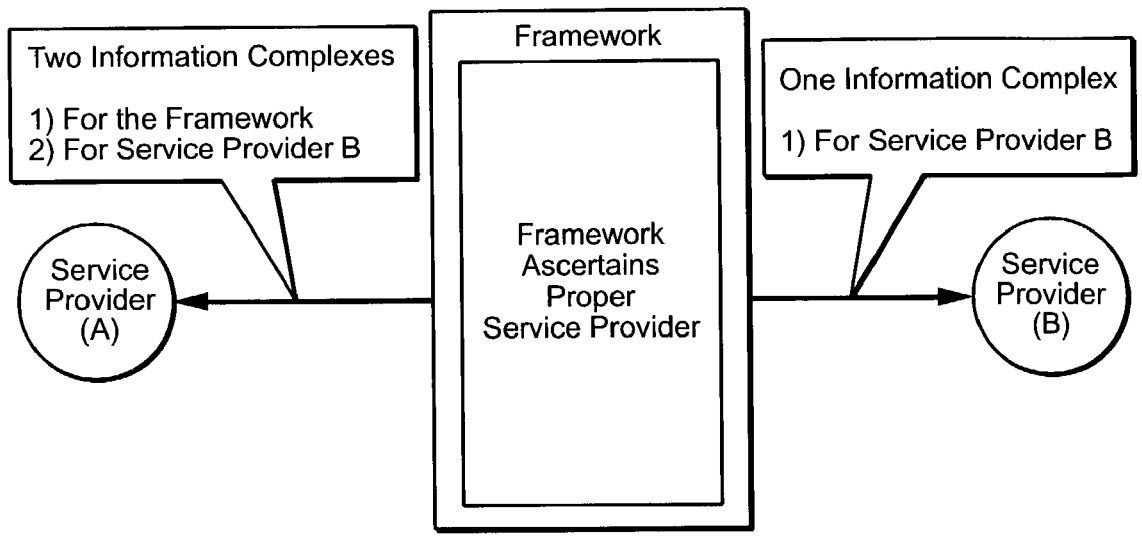
FIG._5
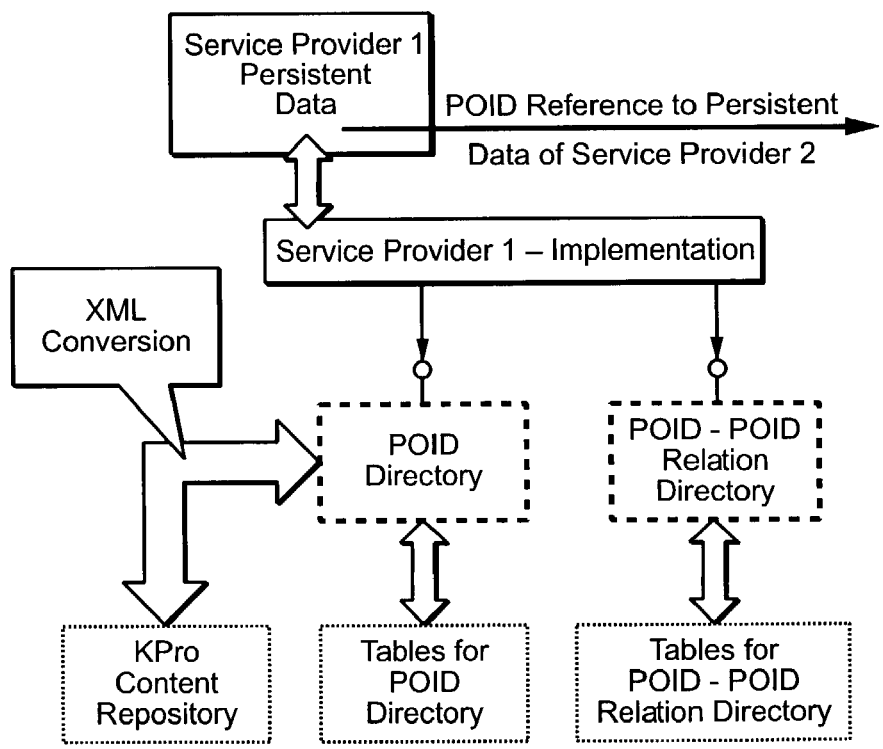
FIG._6

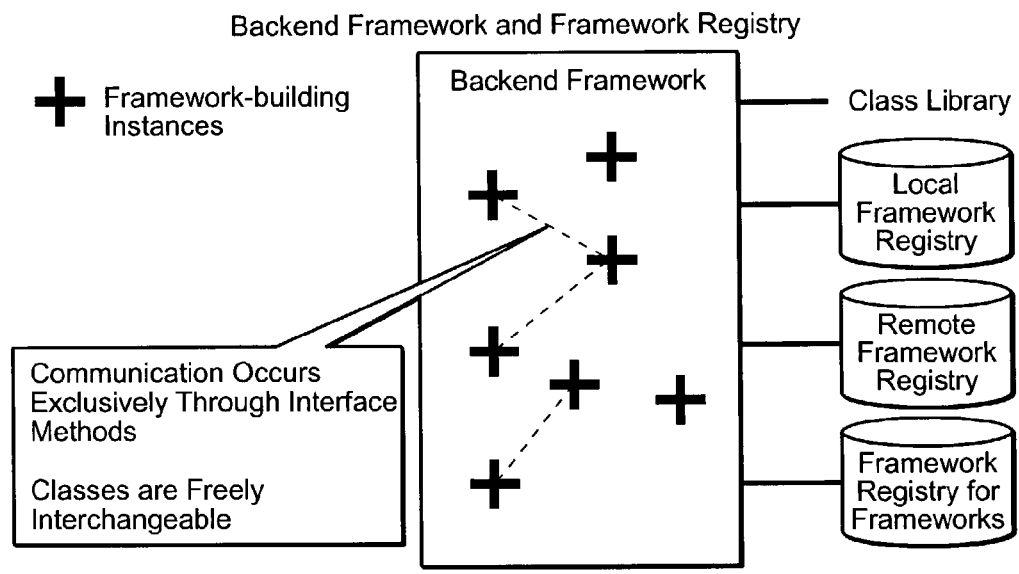
FIG._7
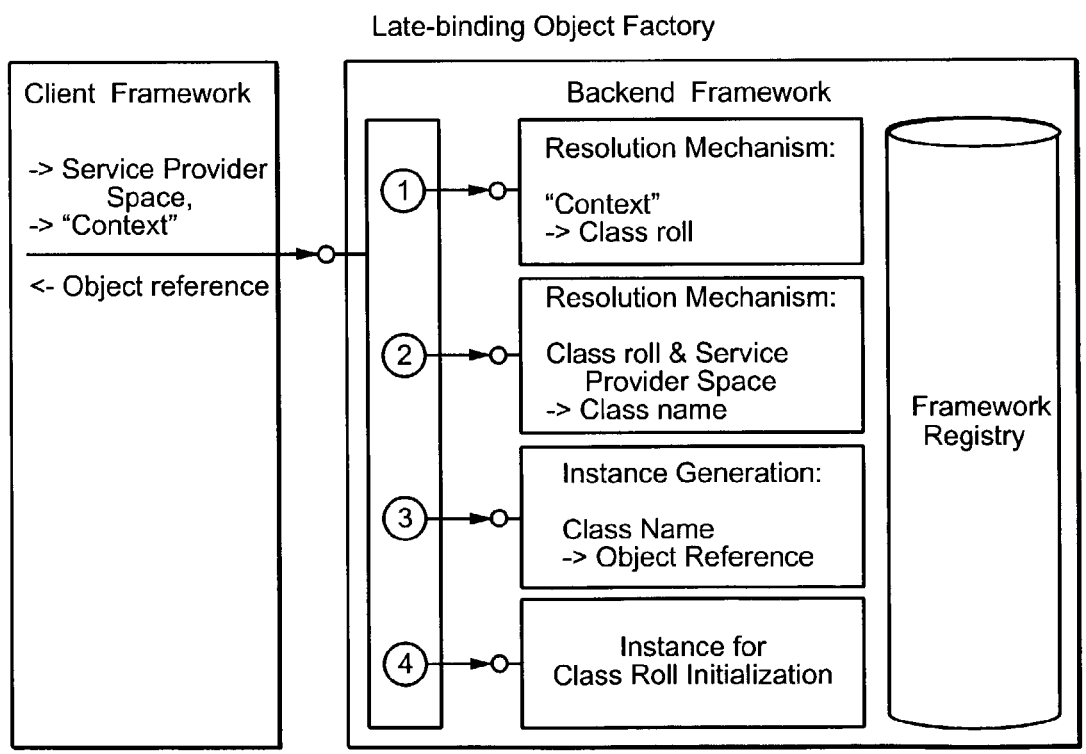
FIG._8

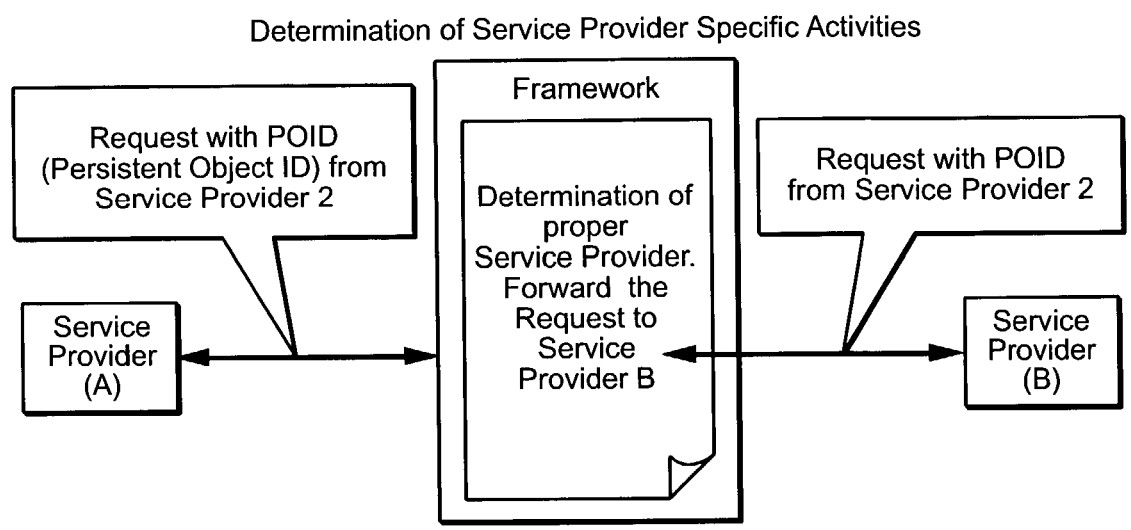
FIG._9

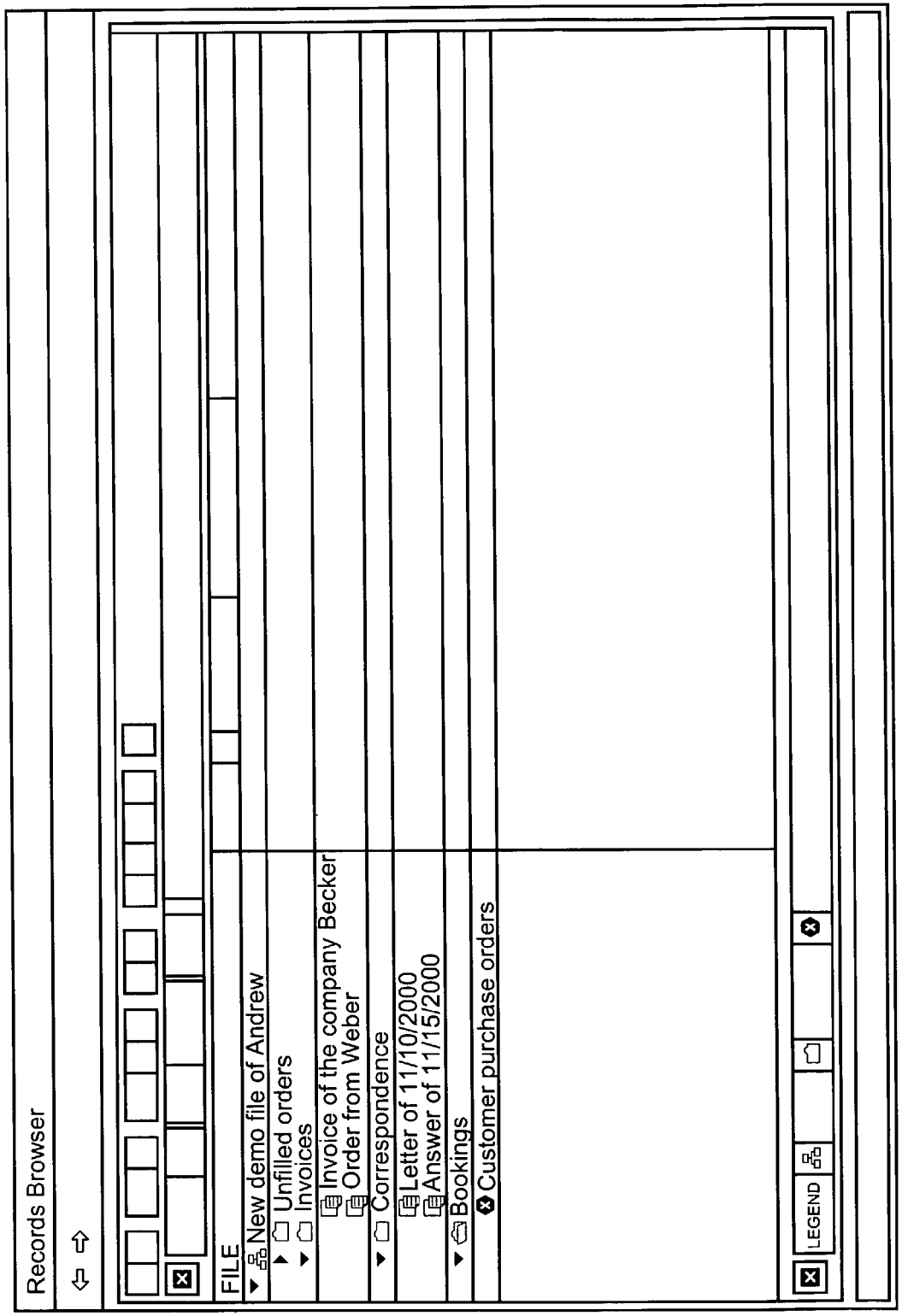
FIG._10

Document Viewer

- New demo file of Andrew
  - Unfilled orders
  - Invoices
    - Invoice of the company Becker
    - Order from Weber
  - Correspondence
    - Letter of 11/10/2000
    - Answer of 11/15/2000
  - Bookings
    - Customer purchase orders

INVOICE

Becker AG
Hartwig and Place
8699 Portsmith Road
Berlin, 10002
Tel 036-6653-0 Fax 035-535-399

Mr. Reckter Inv # 2101

To
Armond Olaff
24555 Pender St
Berlin, 10003

From:
Kohl Trimble
48 Merryvale Way
Hanscorf, 10136

| Inv # | Description | Price/Unit | Qty | Total |
|---|---|---|---|---|
| 46 | 104-300 Odometer | $149.99 | 1 | $149.99 |

|  |  |
|---|---|
| Subtotal | $149.99 |
| Taxes | $12.25 |
| Shipping! | |
| Total Invoice | $162.24 |

INFORMATION | ATTRIBUTE | ATTRIBUTE | VERSION | SEND

LEGEND

*FIG._11*

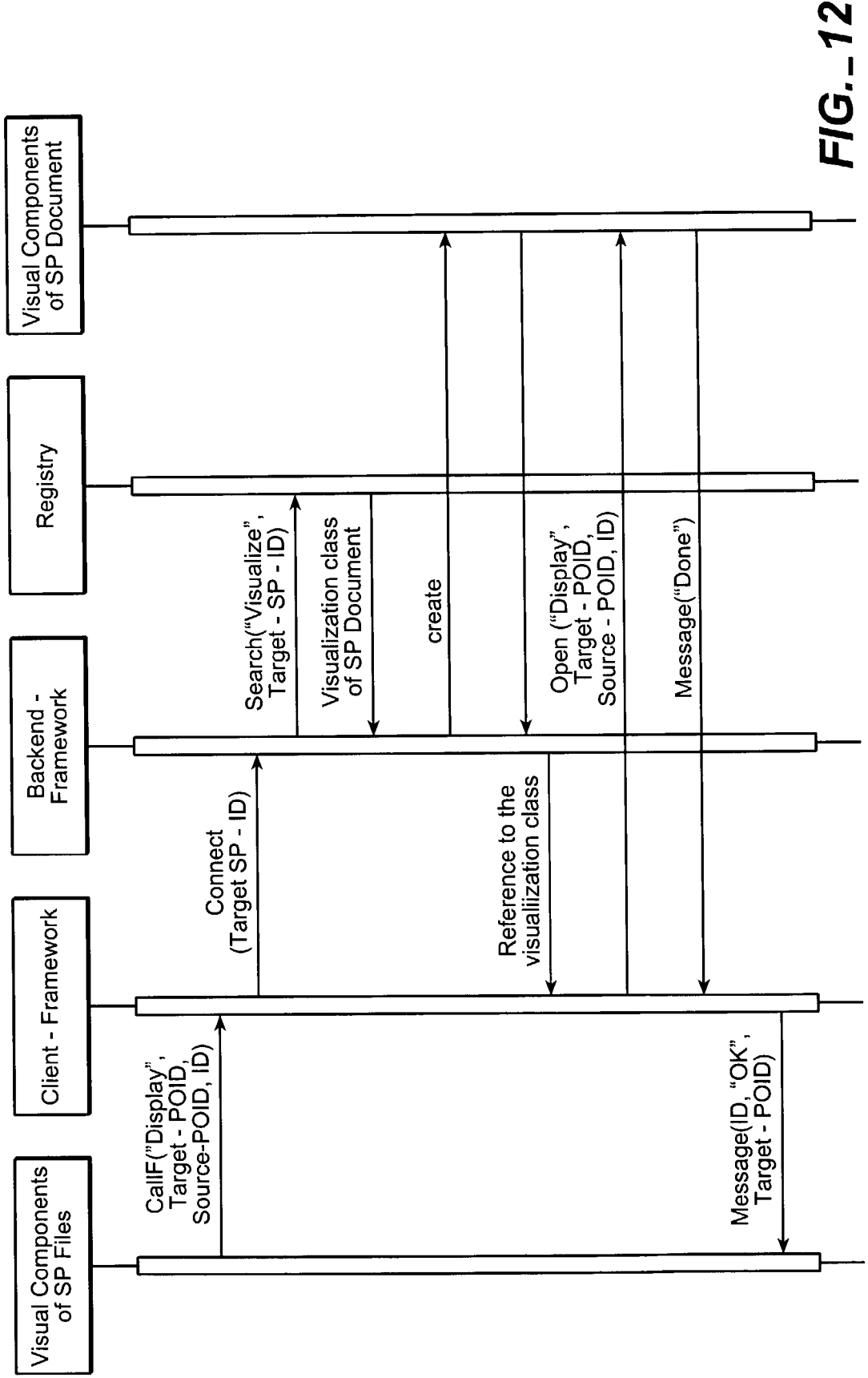
FIG._12

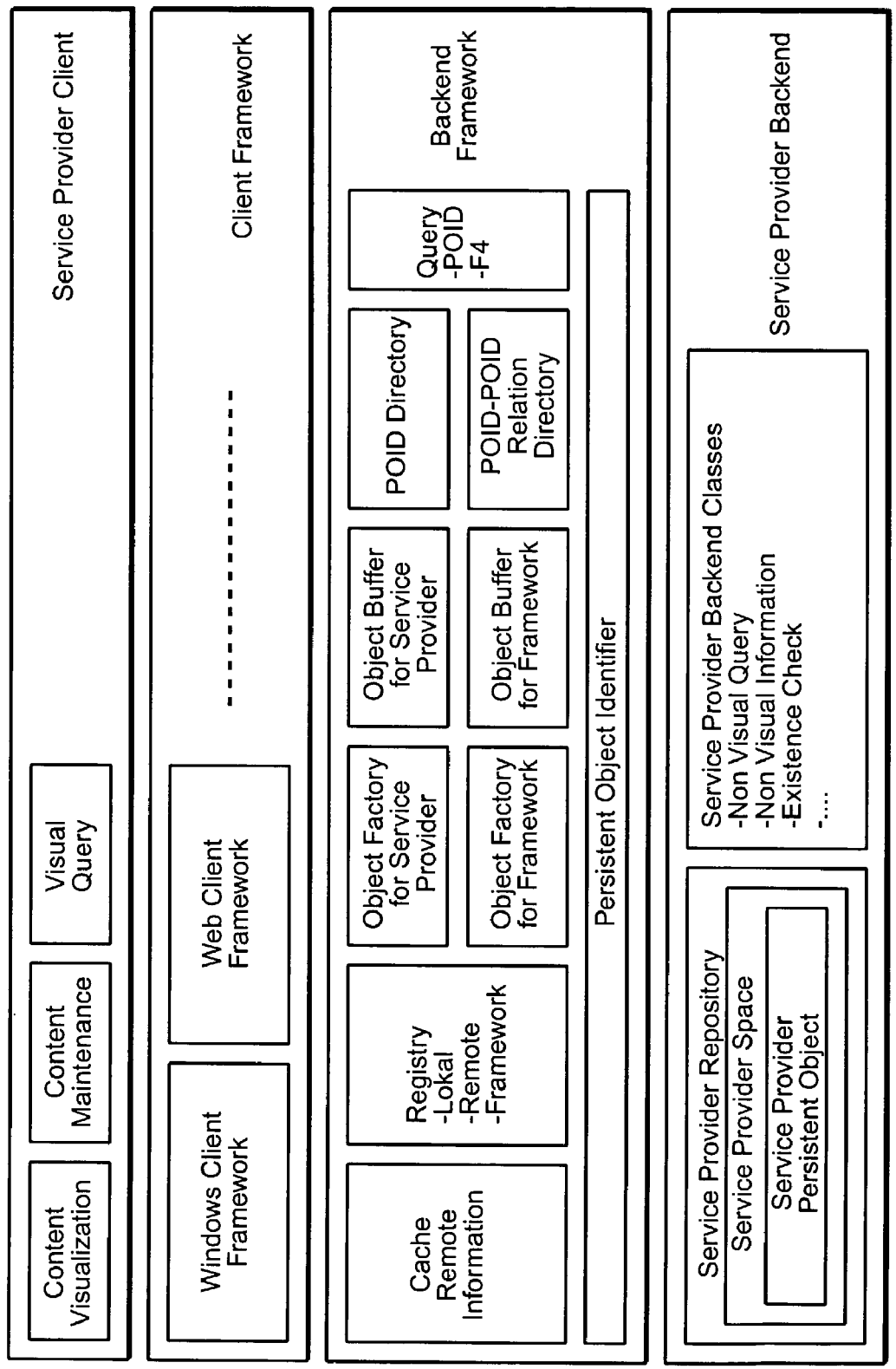
FIG._13

SERVICE PROVIDER INTEGRATION FRAMEWORK IN OBJECT ORIENTED PROGRAMMING ENVIRONMENT

CROSS-REFERENCE TO RELATED APPLICATIONS

This application claims the benefit under 35 U.S.C. § 119(e) of pending U.S. Patent Application No. 60/364,551 filed Mar. 14, 2002, for "Service Provider Integration Framework", and pending U.S. Patent Application No. 60/364,970 filed Mar. 14, 2002, for "Electronic Records Management", the disclosures of which are incorporated here by reference.

BACKGROUND

Most computer program applications can be described in the abstract as the total possible interactions between defined object components.

When programming is done by linking object components to each other, the relationships between the object components become hard coded in a program.

When programming is done by application modeling, object components are linked to each other indirectly, through a framework, for example. The premise behind application modeling is that it is possible in many cases to describe and standardize the interaction of object components in an abstract way so that different object components can be addressed in an identical manner. With application modeling, interaction is thus not implemented by a direct method call to the desired target, but through a standardized method call to a neutral instance (a framework) that forwards the request. The actual programming is thus reduced to the clearly defined and isolated object components.

Application modeling with the help of frameworks has the following advantages. The overall system has a reduced susceptibility to errors. The overall system is easier to maintain. The programming of object components and the modeling of an application are decoupled. The application must only be concerned about the development of its functions (object components). New components can be integrated without programming.

While programming is based directly on a set of object components, in modeling a framework is a neutral instance that resolves all indirection at runtime. By analogy one can imagine a portal that acts as a broker and arranges for services (e.g., applications). This idea is the basis for application modeling. Of course this view is an ideal; in reality it is to be expected that both modeling and programming will be used for the coordination of object components in an actual project.

SUMMARY

The invention features a framework architecture that provides a separate client framework and backend framework, for the integration of service providers. In another aspect, the invention provides class roles, which can be used to determine dynamically a class from a class role at runtime, from which dynamically determined class a programming object can be instantiated. Class roles are advantageously used in the framework architecture.

The architecture of the invention achieves a variety of advantages, some of which will be described in the following paragraphs.

If an object 1 is to interact with an object 2, the interaction is describable without specific knowledge about object 2. This is achieved because requests are addressed to the framework, which determines the suitable service provider and forwards the request to it.

Objects of different granularity are able to interact with each other. The addressing scheme is flexibly definable for different objects. And it is possible to represent the granularity of the service provider objects in a model. These advantages are achieved by use of a persistent object identifier and a service provider space.

Objects having very different functionality are able to interact with each other. This advantage is achieved because the functionality is represented in abstract form.

Objects having different technical implementations are able to interact with each other. This advantage is achieved because the technical implementations of interacting objects are completely protected by means of a neutral instance.

The interaction between different objects can be of different intensity. This advantage is achieved because interactions always occur over a neutral instance that supports optional paths of interaction.

It is not necessary to know which objects will interact with each other in the future. This is achieved by the implementation of a flexible addressing scheme that is convertible to different presentation forms.

Interacting objects need not know with which objects they interact. This is achieved by use of a persistent object identifier, a small number of basic data types at interfaces, a registry, class roles, and late binding.

When N objects are to interact, it is not necessary that each object integrate an interaction with N−1 other objects. This is achieved because each of the N objects communicates exclusively with exactly one neutral instance. Through the neutral instance, all objects can communicate with one another.

The addressing scheme can distinguish between an instance (an object that already exists) and a model (where the object does not exist yet). This is achieved by use of persistent object identifiers and service provider spaces.

A solution implemented in the architecture can be largely independent of the selected client platform. This is achieved because, on each level, there is a clear distinction between client platform-dependent and client platform-independent attributes.

In resolving references, the neutral instance can select those objects that actually work under the given circumstances. This is achieved by use of class roles and by the separation of the backend framework from client frameworks.

Software components of a solution built on the architecture can be exchanged during production. This is achieved because of the indirection of the components at definition time and the late binding at runtime.

The semantics and syntax of local communication are independent of the development platform. This is achieved because local communication occurs exclusively through interface methods, and method parameters are reduced to a small number of basic data types.

The semantics, syntax and implementation of remote communication are independent of the development platform. This is achieved by performing remote communication using XML (Extensible Markup Language) and HTTP (Hypertext Transfer Protocol). Other open, platform-independent technologies can be used as well.

The framework can be implemented efficiently. This is achieved by implementing so that only interface methods are called by interface references, and further by providing system functions to determine classes and instance attributes. Thus, during runtime it is possible to determine system attributes of classes and instances (not to be confused with class attributes and instance attributes).

Framework variants can be defined. This is advantageous for at least two reasons. First, depending on the client platform, different communications technologies may have to be used for the integration of visual service provider components. Second, client and backend framework classes in their implementation are sets of rules that do not always correspond to specific requests. In order to meet these two requirements, client and backend framework are implemented according to the same principles as the service provider integration. This means that class roles are implemented and that local communication uses interface methods exclusively. Thus, every class of client and backend framework can be dynamically exchanged at runtime (without programming), as long as the class role definition is fulfilled. Interface technology (separation of interface and implementation) and class roles thus permit the definition of problem-specific framework variants.

BRIEF DESCRIPTION OF THE DRAWINGS

FIG. 1 is a schematic diagram showing a local configuration of framework and service provider.

FIG. 2 is a schematic diagram showing the implementation of different client frameworks for different communication methods.

FIG. 3 is a schematic diagram showing a framework local, service provider remote topology.

FIG. 4 is a schematic diagram showing a framework remote, service provider local topology.

FIG. 5 is a schematic diagram that illustrates a general schema for addressing objects.

FIG. 6 is a schematic diagram illustrating two directories and an XML representation of a persistent object identified to support the functions of reuse, existence check, and use tracking.

FIG. 7 is a schematic diagram showing a framework registry.

FIG. 8 is a schematic diagram showing a late-binding object factory.

FIG. 9 is a schematic diagram showing how a request flows between service providers and a framework.

FIGS. 10 and 11 each illustrates a user interface screen of an illustrative example of a file management application.

FIG. 12 is a schematic sequence diagram of showing an interaction of two service providers, client framework, backend framework, and registry in responding to a user request.

FIG. 13 illustrates in a graphical way the most framework and service provider components.

DETAILED DESCRIPTION

Figure 14:
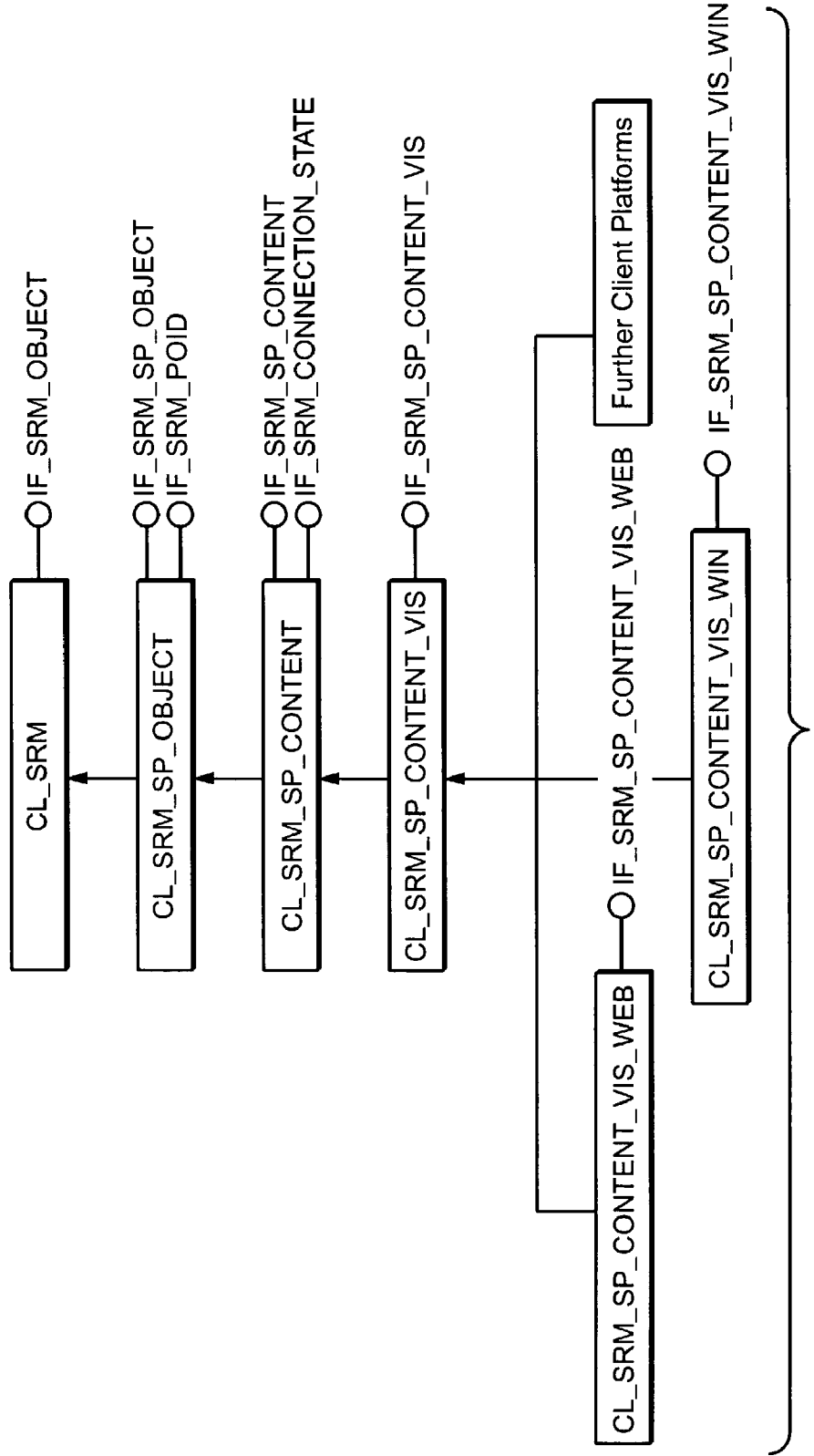
FIG. 14 is schematic diagram showing a hierarchy of abstract classes defining the backbone of one implementation of a framework in accordance with the invention.

First, the framework architecture of the invention will be described.

A description in a "local" view is first given, that is, a view in which there is no remote communication between different systems.

FIG. 1 shows schematically the most important components in a local configuration (that is, a configuration restricted to one system) and introduces the service provider and framework.

A service provider includes a service provider client, a service provider backend, a service provider repository, and a service provider persistent object.

A framework includes a client framework and a backend framework.

Two independent service providers (A) and (B) are shown in FIG. 1. The arrows represent possible communication channels.

Every service provider is responsible for all services to its specific objects. Its responsibilities include in particular: storage of the persistent objects in the service provider repository; visualization of the objects in the service provider client, and access to the objects in the service provider backend.

A framework is made up of a client framework and a backend framework. This division allows one to develop different client frameworks as needed. In particular, all client platform dependencies can thus be shifted to the client framework. Specialized client frameworks, however, can also be created to perform some special processing of objects.

The client framework communicates by means of interface references with objects of the backend framework. The backend framework executes non-visual operations on service providers (that is, on service provider backends). All user interfaces are part of service provider clients that are integrated through the client framework.

Important functions of the client and backend frameworks include:

Query and search coordination over multiple service providers;
Registration of service providers;
Warranting the consistency of runtime object networks;
Buffering of runtime objects;
Definition and partial implementation of standard interfaces;
Arranging requests between different service providers;
Provision of object factory with late binding;
Provision of an abstract class hierarchy for specialization through service providers; and
Provision of service functions for service providers.

In reference to FIG. 1, the communication channels (in a local view) set forth in the table below are to be distinguished. All interfaces between service providers and the framework are defined by the framework.

| Communication partners | | Framework defines? | |
|---|---|---|---|
| Client framework | Backend framework | Yes | The client framework primarily has the task of the coordination of client components. To execute these, it makes use of services of the backend framework |
| Backend framework | Service provider backend | Yes | Through this are processed all non-visual interactions between framework and backend that are independent of the client platform. |
| Client framework | Service provider client | Yes | All interactions between framework and service provider that can be dependent on the client platform. |
| Service provider client | Service provider backend | No | Internal to service provider |

-continued

| Communication partners | | Framework defines? | |
|---|---|---|---|
| Service provider client | Service provider repository | No | Internal to service provider |
| Service provider backend | Service provider repository | No | Internal to service provider |

Which communication channel should be used can be easily decided. Every time one service provider (A) wants to make use of a service of a different service provider (B), the channel over the framework should be used. Every time the information flow is service provider internal, a direct connection should be used. Thus, it is not necessary to transfer service provider internal information over the framework. The interfaces defined by the framework can thus be kept relatively simple.

Depending on the client platforms, it can be necessary to use different communication methods between the components involved. To handle this, different client frameworks can be implemented on the client side to implement the platform-dependent communication methods and call specific service provider client components.

FIG. 2 shows this schematically under the assumption that different communication methods are used for a Windows client (WIN) and a Web browser client (Web).

For distributed scenarios, two distinct cases can be differentiated:

1. Framework local, service provider remote.
2. Framework remote, service provider local.

Restriction to these two cases has the advantage that the topology stays clear and only little data is to be replicated.

In a configuration where the framework is local and the service provider is remote, the framework works exclusively locally. If services of other systems are made use of, it is the task of the service provider to access them.

FIG. 3 shows an example of this topology with different service providers. For system A, four service providers are displayed, each which locally communicates with the framework. Here, service provider (D) accesses system B remotely. The remote access can occur both from the client or the backend side and is completely hidden from the framework.

In a configuration where the framework is remote and the service provider is local, as shown in FIG. 4, the framework works both remotely and locally, while the communication between framework and service provider is still local. If service provider (A) in system A would like to use a service of service provider (1) in system (B), the framework in system A is instructed to do that. The framework in system A transfers the request to the framework in system B, which determines the responsible service provider and passes the request to it.

In one implementation, the communication between the frameworks is by XML messages, while the local communication is based on the call of interface methods. This way, as many systems of different platforms as desired can be combined in a clear topology. The local frameworks communicate exclusively using XML and are thus not visible in their technical implementation from the outside.

The integration model is based primarily on the following elements, which are defined below: class role; service provider type; service provider; service provider space; persistent object identifier (POID); area; and framework These elements will now be described.

A class role is defined by a set of interfaces.

Class role:={Interface}

Interfaces can be mandatory or optional, visual or non-visual.

If at least one interface is visual, the entire class role is regarded as visual.

The complete definition of a class role is then:

Class role := { Interface (visual | non visual) (mandatory | optional) }

A class role provides a mechanism that permits one to assign to a class occupying the class role a certain functionality. The class can then be accessed from the program at runtime by means of this functionality.

Class roles as defined here differ from nested interfaces, which can be explained using a simple example. A service is described through the existence of the interfaces A and B. While A is mandatory, B is defined as optional. The functions of B can exist (but need not) in order to provide the service.

The definition of a class role for the service would look as follows:

SERVICE:={Interface A (mandatory), interface B (optional)}

In order to achieve the same flexibility without class roles, it would be necessary to define another interface. Simultaneously an implicit reference must be made between the two cases:

SERVICE only with A:=interface A

SERVICE with A and B:=interface AB

Where interface AB is defined as:=(Interface A, interface B).

The difference arises from the difference between set creation and hierarchy formation and from the fact that if interfaces exist, they must be implemented.

A service provider type is defined through the assignment of a set of class roles, which can be flagged as optional or mandatory:

| Service provider := | ID |
| | { Class role (optional v mandatory } |

A service provider is first defined through the assignment to exactly one service provider type and a set of classes:

| Service provider := | ID |
| | service provider type ID |
| | { Class } |

Furthermore, every class of a service provider can occupy one or more different class roles, while a class role can be occupied exactly once per service provider.

The definition of a service provider can thus be expanded as follows:

| Service provider := | ID |
| | Service provider type ID |
| | { Class { Class role } } |

Every service provider is responsible for a specific set of data. A service provider is generally implemented as a set of programs that are able to manage this data, visualize this data, and so on. Programs that implement a service provider are generally parameterized. Their behavior can therefore be manipulated from the outside.

Any subset in the dataset of the service provider is an allowed partitioning. The entire dataset is a trivial partitioning.

A service provider makes the definition of the parameters for the partitioning of the dataset known to the framework. They are known as connection parameters. For example, a document archival service provider might partition its documents by document type.

Connection parameter definition :=
{ Service provider parameters for the partitioning }

The service provider definition is thus:

| Service provider := | ID |
| | service provider type ID |
| | { Class {Class role} } |
| | { Connection parameter definition } |

Every service provider that manages persistent objects has a unique key structure for its objects. If the service provider is known, a unique key is a necessary prerequisite in order to access the object.

Key structures are specific to service providers and cannot generally be given in advance. For this reason, every service provider publishes the definition of its unique key to the framework. For example, in a document archival service provider, documents might be described uniquely through their document ID and the ID of the corresponding archive where the documents are stored. The parameter POID for the service provider would thus be the document ID and the archive ID.

The service provider definition is thus:

| Service provider := | ID |
| | Service provider type ID |
| | { Class {class role} } |
| | { Connection parameter definition } |
| | { Persistent object parameter definition } |

Connection parameters represent a partitioning of the service provider dataset. Persistent object parameters allow a unique identification of individual objects in the service provider dataset.

In addition, some situations require the transfer of pure runtime information that does not have any direct connection with the service provider repository. These are referred to as service provider context parameters. The service provider makes a definition of all service provider context parameter definitions that it understands known to the framework. The definition of these parameters is a further part of the service provider definition. For example, in special situations, a service provider for general documents could make only documents in a selected language or in a particular format available. These parameters can only be determined from the corresponding application context and would therefore be typical context parameters.

The service provider definition is thus:

| Service provider := | ID |
| | Service provider type ID |
| | { Class {Class role} } |
| | { Connection parameter definition } |
| | { Persistent object parameter definition } |
| | { Context parameter definition } |

Since the service provider definition represents a discrete entity, any kind of other information can be linked to it. Some examples are:
 Icons for instances of the service provider
 Icons for models of the service provider
 Language-dependent short texts
 Classification of the service provider
 Activities (display, create, delete . . . ) that the service provider supports, both standard activities and service provider-specific activities for instances and models.

The complete service provider definition is thus given by:

| Service provider := | ID |
| | Service provider type ID |
| | { Class { Class role } } |
| | { Connection parameter definition } |
| | { Persistent object parameter definition } |
| | { Context parameter definition } |
| | { Further attributes} |

A service provider is, first of all, defined by means of a set of programs (classes) and their parameters. If the service of a service provider is to be used, one should be able to handle at least the following two particular cases, instance reference and model reference.

In instance reference, a service provider A has knowledge of the complete addressing of a persistent object in a service provider B and would like to execute an action on it (for example, display). Service provider A thus has a complete valuation of the persistent object parameter definition of service provider B and can address the target object in the repository of service provider B through the framework.

In model reference, a service provider A does not have knowledge of the complete addressing of a persistent object in a service provider B and would like to create an object in service provider B or search for an existing object.

In the second, model reference, case, service provider A must be able to inform service provider B under which constraints an object is created or searched for in the repository of service provider B. For this case, two possibilities are available (any combination allowed): the constraints can be defined beforehand; and the constraints are only determined at runtime and cannot be defined beforehand.

Both cases can be covered by the service provider definition. As described above, a service provider is defined, among other things, through a set of connection parameter definitions and a set of all context parameter definitions. Due to the context parameter definitions of service provider B, service provider A is in a position to provide any runtime information that can be handled by service provider B. The connection parameter definitions of service provider B are used at definition time to restrict the set of the possible objects by means of an actual evaluation. Every evaluation of the connection parameters thus identifies exactly one partitioning in the service provider repository.

A first definition of the entity service provider space is thus:

| Service provider space := | ID |
|---|---|
| | Service provider ID |
| | { Connection parameter value } |

Accordingly, a service provider space is defined through an ID, exactly one service provider, and a set of connection parameter values (that refer to the service provider connection parameter definition) that identify exactly one partitioning.

A service provider space can thus also be regarded as a service provider definition that results from a certain parameter setting (connection parameter values). If no parameter setting exists for a service provider, it has exactly one service provider space.

Since the service provider space defines a discrete entity, any further kind of information can be linked to it. Some examples include language-dependent short texts, classification of the service provider space, special activities that can be executed for an instance or a model, and so on.

The complete service provider space definition is thus:

| Service provider space := | ID |
|---|---|
| | Service provider ID |
| | { Connection parameter value } |
| | { Further attributes } |

To describe the interaction of different service providers, it is necessary to supply a general schema for addressing. This schema will first be described independent of any implementation.

The general schema consists of two independent information complexes, as illustrated in FIG. 5. A first information complex is used by the framework to determine the responsible service provider. A second information complex is used by the identified service provider to determine the target object.

A service provider is defined, among other things, through a set of persistent object parameter definitions. By that, parameters are defined whose value definitions uniquely identify objects in the service provider repository.

Thus a first definition results:

| Persistent object identifier | := { Persistent object parameter values } |
|---|---|

The persistent object identifier must contain information that allows the framework to identify the responsible service provider unambiguously. Since the service provider definition is a discrete entity, the service provider ID could be used for that. Another option, however, is to use the service providers space ID, because exactly one service provider is assigned to each service provider space. For the time being, the second option is selected.

Thus the definition can be expanded to:

| Persistent object identifier | := Service provider space ID |
|---|---|
| | { Persistent object parameter values } |

It has already been mentioned above that starting with a service provider A that would like to make use of services from a service provider B, two situations are to be distinguished: service provider A has a reference to a persistent object of service provider B; and service provider A would like to create or search for an object of service provider B.

If both cases are to be represented by an addressing scheme, one must consider whether or not the persistent object parameter values are known in the persistent object identifier. For a persistent object identifier, only three states (initial, model, and instance) and two allowed state transitions (from initial to model and from model to instance) exist.

In order to cover both cases with an addressing scheme, it thus suffices to include the state in the definition. Alternatively, it would be possible to use different schema for identification in each case. The solution described here, however, has advantages because at runtime only one state change is necessary, when a state change from model to instance occurs.

Thus, the definition can be extended to:

| Persistent object identifier := | |
|---|---|
| | Service provider space ID |
| | State |
| | { Persistent object parameter values } |

The persistent object identifier has a GUID (Globally Unique Identifier) as ID. This is advantageous in that the buffering of runtime objects and persistence of the persistent object identifier can be carried out with this ID. However, it is not necessary for the coordination and interaction of service providers.

Thus the definition can be extended to:

| Persistent object identifier | := |
|---|---|
| | ID |
| | Service provider space ID |
| | State |
| | { Persistent object parameter values } |

It can be necessary (1) to extend the persistent object identifier by further more problem-specific attributes, and (2) to have it available in different representations. Both can be achieved by specialization.

Thus, the definition can be completed to:

| Persistent object identifier | := |
|---|---|
| | ID |
| | Service provider space ID |
| | State |
| | { Persistent object parameter values } |
| | { Further attributes } |

While service providers primarily have a technical character according to their definition (set of all classes that implement a certain service), service provider spaces are to be considered as modeling entities, with which a clearly defined subset of all objects can be addressed in the service provider repository.

To create search objects in a service provider repository or access these objects, a framework only needs the specification of the accessed service provider space.

In the communication of a service provider A to a service provider B imparted over the framework, the technical implementation and the existence of service provider B are irrelevant from the viewpoint of service provider A. With the request of service provider A to the framework, the service provider space ID is transferred. The framework determines the underlying service provider (exact classes that were registered by the service provider B) from that and passes the request on to it.

If a new application is to be modeled, the question thus is, which service provider spaces can be used for that. This is enabled through a discrete entity called an "area". Use of an area allows one to introduce cross-framework functions (definition of the POID, possibly the class roles, possibly also the standard activities, and so forth). Use of an area thus allows one to define problem-specific framework variants.

A service provider space is always assigned to exactly one area. Thus, a first definition of the term area is:

```
Area :=    ID
           { Service provider space }
```

For the dynamic selection of service provider spaces and also for visual layout, it is necessary to have criteria at one's disposal that allow this.

Here it is possible to define classification parameters as well as possible value definitions of the parameters for the area. In the service provider space definition, the parameter values can be used to carry out an assigned classification.

The area definition can thus be extended to:

```
Area    :=
        ID
        { Service provider space }
        { Definition classification parameter service provider space}
        { Value classification parameter service provider space }
```

Classes creating a framework can be specialized per area. Through this specialization, framework variants are shaped. The area definition can thus be extended to:

```
Area    :=
        ID
        { Service provider space }
        { Definition classification parameter service provider space}
        { Value classification parameter service provider space }
        { Specialized framework classes }
```

Earlier, the persistent object identifier (POID) was introduced as a general reference to service provider persistent objects. If such a reference is made persistent in the dataset of a service provider, it can become necessary to have a central directory to support the functions of reuse, existence check, and use tracking.

To provide these functions, two directories and an XML representation of the POID can be used. These are illustrated in FIG. 6.

The POID directory registers the POID by means of the POID ID and notes a content repository in which the XML representation of the POID is made persistent. As shown in the figure, the content repository can be a KPro repository, which is a system of the kind described in U.S. Pat. No. 6,134,552 for managing and storing objects.

The POID-POID relation directory registers relations between POID IDs.

To make use of this service, the following information has to be considered in the area definition:
1. Table for POID directory
2. Table for POID-POID relation directory
3. KPro content repository for persistence of the XML The area definition can thus be extended to:

```
Area    :=
        ID
        { Service provider space }
        { Definition classification parameter service provider space}
        { Value classification parameter service provider space }
        { Specialized framework classes }
        { Information on POID and POID—POID relation directory )
```

Class roles allow the dynamic determination of classes and the instantiation of objects of these classes. Through the area-specific definition of class roles, the framework can implement a service that allow this also when the class roles are not already predefined by the framework.

The complete area definition is thus:

```
Area:=ID
        { Service provider space }
        { Definition classification parameter service provider space}
        { Value classification parameter service provider space}
        { Specialized framework classes }
        { Information on POID and POID—POID relation director }
        { Area-specific class roles }
```

Both the backend framework and all possible client frameworks (and their variants) are structured according to the same principle as in service provider integration. In particular, this means that the framework is defined through a set of classes that occupy certain class roles.

The backend and client frameworks are defined as follows:

```
Backend framework :=    ID
                        { Class { Class role } }
Client framework :=     ID
                        { Class { Class role } }
```

Thus, all classes creating a framework can be substituted without programming. This is the basis for the implementation of framework variants that adapt themselves to specific problems.

In the framework registry is deposited all information needed by the framework to perform a coordination of service providers at runtime. This includes all definitional data for the terms introduced above.

As shown in FIG. 7, the framework registry can be separated into a local framework registry, a framework registry in a distributed landscape, and a framework registry for frameworks. These form three largely independent stores in which all information is contained. Access to the information occurs exclusively through the backend framework. If a client framework or service provider needs specific information from the registry, it can be read using special interfaces.

The link between the data stored in the registry and the information needed in a program at runtime is produced by the previously defined class role. The program basically knows the class role and the ID of a service provider space. This information suffices to determine dynamically the necessary class at runtime with the help of the registry.

A local framework registry enables the framework to carry out local coordination. As described above, a local framework communicates exclusively with local service providers in this situation. For this, the following information is defined in the local framework registry: area definition, area classification parameters values, service provider definition, and service provider space definition. This information can be obtained interactively from a developer through a multi-level user interface of data entry screens of conventional design.

Service providers are primarily defined through the registered classes.

For all parameter definitions, standard features are registered. It is advantageous that the registration of the parameters occur automatically through a class role to be implemented by the service provider. This avoids manual errors in maintenance. Also, the service provider implementation must refer to the identical definition and thus needs it in the implementation.

To implement the above-described distributed model, it is necessary to have information about the local frameworks of other systems available in every local framework. To this end it is sufficient provide through an administrative process the information as to which of the distributed systems have a framework. The information comparison between the frameworks can then occur to a large extent automatically and the information can be made available for quick access through local caching.

For arranging the services between different service providers, only the service provider space ID is necessary. Consequently, it suffices to set up a cache in every system that lists all service provider space IDs for every system.

The cache can be implemented to operate on demand, as follows. When a local framework receives a request for a service provider space that is not known to the local framework, the local framework turns to the local service provider space cache and determines the responsible system from there. If the service provider space cache does not know the service provider space ID, the request is passed on to another system, which proceeds in the same way, until the service provider space is found.

The framework registry is maintained in a table. Every class of the framework can be dynamically replaced, as is the case with service providers.

To achieve an interchangeability of all service providers as well as the actual implementation of each particular service provider, all object instances are generated exclusively by the framework. The name of the class is determined from the registry, and the instance is dynamically created and initialized at the latest possible point in time. Thus it is ensured that no service provider depends on the static name of a class of another service provider or of the framework.

FIG. 8 shows the flow for the dynamic creation of an instance with initialization and late binding for the case where a client framework requires a service provider object.

The client framework requests the instance from the backend framework and passes the following information: service provider space to be called, and context information that influences the selection of the class role and thus the class.

The backend framework dynamically determines the class role from the context, the class to be used from the class role, creates the instance, and carries out an initialization of the generated object that matches the class role. The object reference is returned to the client framework.

All objects that are part of a framework are dynamically instantiated by means of a class role at the latest point in time according to the same principle as for service providers.

Through the object factory, the framework has the full control of all instances that interact using the framework. Furthermore, an object buffer is provided that buffers all service provider instances. Objects are thus always only generated and buffered when they are needed.

An object buffer for frameworks is provided, having the same function and functionality as the object buffer for service providers, applied to instances of the framework.

The persistence of instance data occurs through the responsible service provider repository. The framework serves exclusively as a broker and does not have any persistence service for service provider objects. For the identification of the persistent service provider objects, the persistent object identifier described earlier is used.

The service provider is exclusively responsible for authorizing access at the level of individual objects. At a higher level, authorization checks on area and service provider spaces can be performed. Since the service provider spaces structure the service provider dataset in a desired granularity, authorization for subsets can thus be assigned at the level of service provider spaces.

In considering integration interfaces, a distinction is made between local and remote communication. The communication between framework and service providers is always regarded as local; the communication between different frameworks, as remote.

Local communication occurs through use of interface methods.

The data types of the method parameters can be reduced to a few basic data types, for example, Boolean, integer, string, binary, object, and URL (Uniform Resource Locator).

The implementation of a local framework can thus be made independent of the development platform. Semantics and syntax of the interface methods are independent of the selected programming language.

Remote communication occurs using XML messages over HTTP. This ensures that local frameworks are interchangeable, in particular, that the local frameworks are platform independent and vendor independent.

Service providers must themselves be able to determine to at least a certain extent the degree of integration detail. Different service providers by nature have a different range of services.

To achieve a very high degree of flexibility, two different mechanisms are provided that complement each other: first, optional class roles and optional interfaces at definition time; second, determination of service provider for specific activities at runtime.

As noted above, class roles are implemented by service providers. A framework anticipates that a class role definition may have optional interfaces and that a class role may be defined as optional.

For example, an optional class role can be defined by a framework to search the dataset of a service provider. If a service provider implements this class role, the framework automatically makes the search available as a possible activity on the service provider to every other service provider.

Service providers can offer specific activities that are useful only in combination.

As illustrated in FIG. 9, to make the specific activities of a service provider B accessible to a service provider A, a client-dependent interface provides a method with which the framework can find the specific activities at runtime.

Thus, it is possible for service provider B to make its specific activities dependent on persistent object attributes at any desired granularity.

The runtime of the framework is also built on the object factory principle with late binding. All classes, whose instances create the framework at runtime, can be dynamically replaced at runtime.

The ability to substitute of framework classes allows individual applications or even individual service providers to specialize the rule types of the frameworks for their purposes.

The framework thus not only enables a flexible integration of service provider components, but also a problem-specific specialization of the framework itself.

An example of framework specialization is the POID object. The persistent object identifier (POID) introduced above is represented at runtime as an object. A class of the framework exists for this, which is always used when the application does not make a specialization. If it is necessary for the application to transfer further information with the POID object, it can make a specialization of the class and register the specialized class in the framework registry.

The persistent object identifier is convertible into different display formats. Reasons for this include the following.

1. In a local communication, the quickest and most flexible type of communication is the exchange of object references. For this reason, a class representation of the persistent object identifier is required.

2. In some situations it is necessary to make the persistent object identifier itself persistent. For this, an XML representation is advantageous.

3. If an object is to be called using HTTP, a URL representation is necessary.

Conversion into different display formats can be carried out in part generically and in part only with the help of service providers.

In the implementation of searches of data maintained by service providers, one can distinguish five cases using the following questions:

What is being searched for?
 "Value" search: Determination of possible attribute values
 "POID" search: Determination of the complete POID
Where is the search to be performed?
 One service provider
 Several service providers simultaneously
 One service provider space
 Several service provider spaces simultaneously Who supplies the search dialog?
 Service provider
 Framework
Is the search local and remote search?

From the set of all possible combinations of the above questions and answers, the cases listed in the following table are particularly useful.

| Case | Searching for? | Where? | Search dialog provided by? | |
|---|---|---|---|---|
| P1 | POID | One service provider space | Service provider | Implemented using special class roles. |
| P2 | POID | One service provider | Service provider | Can be reduced to P1. |
| P3 | POID | Multiple service provider spaces | Service provider/ Framework | Can be reduced to case P2 (homogeneous) or to case P4 (inhomogeneous with respect to service providers). |
| P4 | POID | Multiple service providers | Framework | Implemented as special service of the framework. |
| F1 | Value | Service provider | Service provider/ Framework | Allows a service provider A to determine a set of values for an attribute of a service provider B. |

As has been noted, a local framework communicates locally with service provider components by means of interface methods. The framework accepts a request of a service provider A, determines the responsible service provider B, generates the visual query object of service provider B and instructs it to execute the search. The visual query object of service provider B returns a POID.

In case P4 in the local view on query, the initial situation is that a service provider A would like to carry out a combined search in the data of N other service providers; however, because different service providers are involved, the search dialog must be provided by the framework. The following approach is taken:

Each of the N service providers has a class role implemented to perform a background search.
 Each of the N service providers has published its searchable attributes to the framework.
 The framework generates a search dialog for the user.
 The framework accepts the input from the search dialog and distributes the search request to the service providers involved.
 The framework accepts the search results of the N involved service providers, formats the results list, and presents it to the user.
 The framework delivers the selected results set to service provider A.

To implement this approach, an alias for searchable attributes is necessary in order to scale the semantics of the service providers' attributes cross-application.

In case F1 in the local view on query, service providers publish certain attributes to the framework. For example, to implement an input help service provider cross-application, the following are sufficient: The service provider implements a class role for the input help; and the service provider classifies its published attributes according to "Input help supported: yes, no".

The following example of an implementation of a file management application illustrates the integration and interaction of the different components. (In the present context, the word "file" has the sense of a collection of related documents.) The example will show what happens if, for example, an element of a file is displayed from a file browser of the file management application.

As shown in FIG. 10, the file browser is used to display the structure of a file. The file browser itself is a service provider, which in this example will be called "Service Provider File" or "SP File", in the visual component of which a file instance is displayed. The individual elements of the file are either instances or models of different service provider spaces.

After selecting a node, an activity supported by the service provider for the corresponding element can be selected and executed using a context menu. If, for example, as shown in FIG. 11, the selected instance is to be displayed (in this case, a document, the invoice from Becker), the visual component of the corresponding service provider is called (which service provider will be called, in this example, "Service Provider Document" or "SP Document") and the corresponding instance is displayed in the right window of the client framework. (As noted above, all user interfaces are part of service provider clients that are integrated through the client framework.)

This example will be used to describe briefly what the communication of the service providers with the framework basically looks like.

In the file, the persistent object identifiers are defined at the corresponding nodes. If it is an instance node (e.g., "invoice of the company Becker"), the POID is in the state "instance", that is, both the framework-specific parameters and the service provider-specific values are completely defined. In the case of a model node ("customer purchase orders"), only the framework-specific parameters (POID-ID and service provider ID) are set and the POID is in the status "model".

If a context menu is requested on the instance node, Service Provider File calls a service function of the framework and transfers the corresponding POID to the framework. The framework now determines which activities Service Provider Document makes available. For this purpose, the framework first determines the service provider ID from the POID and then determines the class of the service provider, where the information can be read using the supported activities, with the help of the registry and the corresponding class role. To supply this information, the service provider implements a corresponding interface at this class so that the framework can read the supported activities using a defined method call. The framework then assembles a context menu from the now known activities and returns this context menu to Service Provider File, which then displays it. If the user selects, for example, the activity "Display" in this context menu, Service Provider File triggers an event, for which the client framework has registered itself and transfers the selected activity, the POID of the target object, its POID, and a unique ID to the framework. The client framework again first determines the ID of the service provider from the target POID and has the backend framework determine the necessary class of the service provider. For this purpose, the backend framework first connects to the service provider and checks whether the requested object exists at all in the repository of the service provider. If not, the display action would be cancelled at this point. If the object exists, the backend framework again determines the class of the service provider in which the requested function (here the visualization) is implemented; it determines this from the registry with the help of the corresponding class role and the service provider ID. The backend framework instantiates this class and transfers the reference to this class to the client framework. The client framework calls the corresponding interface method on this class to start the visual component and transfers the requested activity. It is the sole responsibility of Service Provider Document to determine in which form the corresponding object is visualized. The client framework basically only expects as a return value a reference to the visual object and some information regarding whether the requested activity could be performed. The visual object is then placed in the corresponding window of the client framework and the calling Service Provider File is informed that the requested action "Display" has been successfully carried out.

FIG. 12 is a sequence diagram in which the actual display call is once again represented. The call of the backend framework to the document service provider to check whether the target object exists in the repository of the service provider is omitted for clarity.

This example illustrated that the individual service providers communicate only with the framework. Direct communication between the service providers does not occur.

As a form of summary, FIG. 13 illustrates in a graphical way the most important components that have been described and their relationship to each other.

The description will now turn to:
Classes and class roles of the framework; and
Class roles and interfaces to be implemented by service providers for an integration.

FIG. 14 shows a segment from the hierarchy of the abstract classes, which make up the backbone of the framework and cannot be exchanged. All classes creating a service provider and framework are directly or indirectly derived from one of these abstract classes. From which level in the hierarchy the inheritance must be made, depends on the class role definition.

This "class view" on the framework architecture is thus not a strict hierarchy of classes, but a frame of abstract classes extended by the definition of class roles.

CL_SRM is the uppermost class in the entire hierarchy. General services are implemented in this class, which are accessible by interface methods. For this purpose, the interface IF_SRM_OBJECT is implemented with this class. All classes creating a service provider and framework directly or indirectly inherit from CL_SRM.

The interface IF_SRM_OBJECT has the following methods.

| Method | |
| --- | --- |
| GET_MY_INTERFACES | Returns a list of all interfaces of the object. Is used, for example, to check object references at runtime |
| IS_INTERFACE_AVAILABLE | Returns TRUE if a certain interface exists. |
| IS_OBJECT_OF_CLASS_ROLE | Returns TRUE if object occupies a certain class role |
| GET_POSSIBLE_CLASS_ROLES | Returns all possible class roles. Classes can be possible for multiple different class roles. |
| ADD_OBJECT_CLASS_ROLE | Sets an active class role. |
| GET_MY_OBJECT_REFERENCE | Returns object reference |
| GET_MY_CLASS_REGISTRY | Returns framework class registry object of the registered class. |

-continued

| Method | |
|---|---|
| GET_ROOT | Returns framework root object. |
| GET_RMF_SERVICE | Returns framework that provides various services for service providers. |
| SET_RELATED_OBJECT | Set relationships to other objects. |
| GET_RELATED_OBJECT | Returns relationships to other objects. |
| DELETE_RELATED_OBJECT | Delete relationship to other objects. |
| SET_RMF_SYSTEM_DATA | Setting of system data through framework. |

Through implementation with an abstract base class, these methods are available with every object.

Class CL_SRM_SP_OBJECT: All methods of the interfaces IF_SRM_SP_OBJECT and IF_SRM_POID are implemented by the framework with this class. The implementation of IF_SRM_POID here is only a shortcut to the POID object and the implementation of IF_SRM_POID on the POID object.

The interface IF_SRM_SP_OBJECT has the following methods.

| Method | |
|---|---|
| GET_POID_OBJECT | Returns the object reference to the POID object |
| SET_POID_OBJECT | Writes the object reference to the POID object |
| GET_CONNECTION_PARA_VALUES | Returns a list of object references to attribute value objects of all connection parameters |
| SET_CONNECTION_PARA_VALUES | Writes a list of object references to attribute value objects of all connection parameters |

The interface IF_SRM_POID has the following methods.

| Method | |
|---|---|
| GET_POID_ID | Reader of the POID ID |
| GET_SPS_ID | Reads the service provider space ID |
| GET_RMF_POID | Reads the entire framework portion of the POID |
| GET_SP_POID | Reads the entire service provider portion of the POID |
| GET_POID_STATE | Reads the status of the POID object |
| GET_SP_POID_ATTR_VAL_BY_NAME | Reads a portion of the service provider portion of the POID |
| GET_DISPLAY_NAME | Reads a language-dependent short text |
| SET_RMF_POID | Writes the entire framework portion of the POID |
| SET_SP_POID | Writes the entire service provider portion of the POID |
| SET_POID_DATA | Writes the entire POID |

Class CL_SRM_SP_CONTENT: The framework uses this class to implement all methods of the interfaces IF_SRM_SP_CONTENT and IF_SRM_CONNECTION_STATE. The implementation of IF_SRM_CONNECTION_STATE here is only a shortcut to the connection state object and the implementation of IF_SRM_CONNECTION_STATE on the connection state object.

The interface IF_SRM_SP_CONTENT has the following methods.

| Method | |
|---|---|
| SET_CONNECTION_STATE_OBJECT | Sets the connection state object |
| GET_CONNECTION_STATE_OBJECT | Reads the connection state object |

| Method | |
|---|---|
| GET_ALLOWED_SUCCESSORS | Returns the list of the allowed succession statuses |
| GET_STATE | Reads the connection state |
| SET_STATE | Sets the connection state |

Class CL_SRM_SP_CONTENT_VIS: The visualization of service provider content depends on the selected client platform. The abstract class CL_SRM_SP_CONTENT_VIS summarizes platform-independent visualization attributes and is further subject to platform-specific specialization. Below, the specialization for example WIN and WEB platforms is described.

The interface IF_SRM_SP_CONTENT_VIS is implemented with the class CL_SRM_SP_CONTENT_VIS by the framework. The interface has the following methods.

| Method | |
|---|---|
| GET_POSITION | Reads the item of the visualization object. |
| GET_CONTENT_CONNECTION_OBJECT | Reads the respective content connection object (backend) of the service provider |
| GET_VISUALIZATION_STATE_OBJECT | Reads the respective status object for the object of the visualization. |
| SET_CONTENT_CONNECTION_OBJECT | Sets the respective content connection object (backend) of the service provider |
| SET_VISUALIZATION_STATE_OBJECT | Sets the respective status object for the object of the visualization. |

Class CL_SRM_SP_CONTENT_VIS_WIN: This abstract class is implemented by the framework. All service provider-specific classes for the visualization and maintenance of the service provider content on a Windows client platform are directly or indirectly derived from this class.

Class CL_SRM_SP_CONTENT_VIS_WEB: This abstract class is implemented by the framework. All service provider-specific classes for the visualization and maintenance of the service provider content in a Web client platform are directly or indirectly derived from this class.

Now, some example class roles for service providers and the framework will be described.

Class roles can be defined separately for every kind of application; the class roles for service providers listed here are therefore to be understood only as examples.

Class role IS_SP_SYSTEM_CLASS: The framework uses the interfaces of this class role to determine information that characterizes the service provider.

Attributes of the class role are:
Backend class role, client-independent
Non-visual
Mandatory
Interfaces of the class role are:

| Interface | |
|---|---|
| IF_SRM_OBJECT | Implemented by framework in CL_SRM |
| IF_SRM_SP_SYSTEM_PARA | To be implemented by service provider: this is mandatory mandatory |

The interface IF_SRM_SP_SYSTEM_PARA has the following methods.

| Method | |
|---|---|
| GET_CONNECTION_PARA_DESCR | Delivers a list of attribute description objects that completely describe all service provider connection parameter definitions |
| GET_SP_POID_PARA_DESCR | Delivers a list of attribute description objects that completely describe all service provider persistent parameter definitions |
| GET_CONTEXT_PARA_DESCR | Delivers a list of attribute description objects that completely describe all service provider context parameter definitions |

Class role IS_SP_CONTENT_CONNECTION_CLASS: The framework opens a connection to the service provider backend using this class role and can then execute different methods over this connection.

Attributes of the class role are:
Backend class role, client-independent
Non-visual
Mandatory
Interfaces of the class role are:

| Interface | |
|---|---|
| IF_SRM_OBJECT | Implemented by framework in CL_SRM OBJECT |
| IF_SRM_SP_OBJECT | Implemented by framework in CL_SRM SP_OBJECT |
| IF_SRM_SP_POID | Implemented by framework in CL_SRM SP_OBJECT |
| IF_SRM_SP_CONTENT | Implemented by framework in CL_SRM SP_CONTENT |
| IF_SRM_CONNECTION_STATE | Implemented by framework to CL_SRM SP_CONTENT |
| IF_SRM_CONNECTION | To be implement by service provider; mandatory |
| IF_SRM_CONNECTION_NEW | To be implemented by service provider; optional |
| IF_SRM_CONNECTION_LOCK | To be implemented by service provider; optional |
| IF_SRM_CONNECTION_ATTRIBUTES | To be implemented by service provider; optional |

The interface IF_SRM_CONNECTION brings together methods that make it possible to open and control a connection to the service provider repository.

The interface IF_SRM_CONNECTION_NEW brings together methods that make it possible to create new objects in the service provider repository.

The interface IF_SRM_CONNECTION_LOCK brings together methods that make it possible to lock objects in the service provider repository.

The interface IF_SRM_CONNECTION_ATTRIBUTES brings together methods that make it possible to read and manipulate attributes of service provider repository objects.

Class role IS_SP_NON_VISUAL_INFO_CLASS: This class role enables the framework to collect information on the service provider and service provider objects.

Attributes of the class role are:
Class role backend, client-independent
Non-visual
Optional
Interfaces of the class role are:

| Interface | |
|---|---|
| IF_SRM_OBJECT | Implemented by framework in CL_SRM OBJECT |
| IF_SRM_SP_OBJECT | Implemented by framework in CL_SRM SP_OBJECT |
| IF_SRM_SP_POID | Implemented by framework in CL_SRM SP_OBJECT |
| IF_SRM_NON_VISUAL_INFO_SP | To be implemented by service provider; optional |

The interface IF_SRM_NON_VISUAL_INFO_SP has the following methods.

| Method | |
|---|---|
| GET_SPECIFIC_INFO_LIST | Returns a list of arbitrary service provider specific information. |
| GET_STANDARD_INFO_LIST | Returns a list of standard framework information. |

Class role IS_SP_MENUE_WIN_CLASS: This class role summarizes interfaces that are necessary so that a service provider can integrate an menu object in the frames of the Windows client framework under Windows (client).

Class role IS_SP_VISUALIZATION_WIN_CLASS: This class role summarizes interfaces that are necessary so that a service provider can integrate an object for the visualization of its contents under Windows (client).

Class role IS_SP_VISUAL_QUERY_WIN_CLASS: This class role summarizes interfaces that are necessary so that a service provider can integrate a visual query object under Windows (client).

Class roles of the framework: As mentioned above, the classes creating a framework are determined by a late binding with defined class roles in the same way as is done for the service provider integration. Thus, all classes are interchangeable. The following table lists some class roles for classes creating a framework.

| Class role | |
|---|---|
| IS_ATTRIBUTE_VALUE_CLASS | Instances of this class are attribute value. |
| IS_CLIENT_FRAME_WIN_CLASS | Client frame for Win GUI |
| IS_CONNECTION_ATTR_DESCR_CLASS | Attribute description class for connection parameters |
| IS_CONTEXT_ATTR_DESCR_CLASS | Attribute description class for context parameters |
| IS_POID_CLASS_FOR_SP | POID class for SP |
| IS_POID_CONVERTER_CLASS | POID converter class |
| IS_POID_DIRECTORY_CLASS | POID directory class |
| IS_POID_REPOSITORY_CLASS | POID repository class |

As described above, this indirection is the basis for the creation of framework variants.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. The essential elements of a computer are a processor for executing instructions and a memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims.

What is claimed is:

1. A data process system, comprising:
    means for establishing a class role, a class role being a computer programming construct that assigns to a class occupying the class role a functionality in terms of a set of interfaces, where the class role defines each interface in the set as being either mandatory or optional;
    means for determining dynamically a class for the class role at runtime; and
    means for instantiating a programming object from the dynamically determined class.

2. The system of claim 1, further comprising:
    means by which the class determined dynamically can be accessed from a program at runtime.

3. The system of claim 1, wherein the class role further defines each interface in the set as being either visual or non-visual.

4. A computer program product, tangibly embodied on a computer-readable medium, comprising instructions operable to:
    establish a class role, a class role being a computer programming construct that assigns to a class occupying the class role a functionality in terms of a set of interfaces, where the class role defines each interface in the set as being either mandatory or optional;
    determine dynamically a class for the class role at runtime; and
    instantiate a programming object from a class determined dynamically for the class role at runtime.

5. The product of claim 4, further comprising instructions to:
    access the class determined dynamically from a program at runtime.

6. The product of claim 4, wherein the class role further defines each interface in the set as being either visual or non-visual.

7. A data processing system, comprising:
    a service provider, the service provider comprising a service provider client, a service provider backend, and a service provider repository for storing service provider persistent objects, where the service provider provides to its objects the services of storage of persistent objects in the service provider repository, visualization of objects in the service provider client, and access to objects in the service provider backend;
    a framework comprising a client framework and a backend framework, where the client framework communicates directly with the backend framework, and the backend framework performs non-visual operations on the service provider backend; and
    a persistent object identifier (POID) object providing a general reference to a first persistent object of the service provider, the POID including information identifying the service provider and a primary key distinguishing the first persistent object from all other objects of the service provider;
    where the framework is operable to use information identifying the service provider to determine which among all the service providers known to the framework is the service provider identified by the POID, and the service provider is operable to use the primary key to obtain the first persistent object.

8. The system of claim 7, wherein:
    the POID object is maintained in a persistent form as an Extensible Markup Language (XML) document.

9. The system of claim 7, wherein:
the POID object is a model for a service provider repository object that does not yet exist.

10. The system of claim 7, wherein:
all client platform dependencies of the framework are in the client framework; and
all client platform dependencies of the service provider are in the service provider client.

11. The system of claim 7, wherein:
the framework generates dynamically all object instances of service provider objects.

12. The system of claim 7, wherein:
all objects that are part of the framework are instantiated dynamically by means of a class role, a class role being a computer programming construct that assigns to a class occupying the class role a functionality in terms of a set of interfaces, where the class role defines each interface in the set as being either mandatory or optional.

13. The system of claim 7, wherein the framework is operable to:
coordinate queries and searches over multiple service providers;
register service providers;
arrange requests between different service providers;
provide an object factory with late binding; and
provide an abstract class hierarchy for specialization through service providers.

14. A computer program product, tangibly embodied on a computer-readable medium, comprising instructions operable to:
implement a service provider, the service provider comprising a service provider client, a service provider backend, and a service provider repository for storing service provider persistent objects, where the service provider provides to its objects the services of storage of persistent objects in the service provider repository, visualization of objects in the service provider client, and access to objects in the service provider backend;
implement a framework comprising a client framework and a backend framework, where the client framework communicates directly with the backend framework, and the backend framework performs non-visual operations on the service provider backend; and
implement a persistent object identifier (POID) object providing a general reference to a first persistent object of the service provider, the POID including information identifying the service provider and a primary key distinguishing the first persistent object from all other objects of the service provider;
where the framework is operable to use information identifying the service provider to determine which among all the service providers known to the framework is the service provider identified by the POID, and the service provider is operable to use the primary key to obtain the first persistent object.

15. The product of claim 14, further comprising instructions to:
maintain the POID object in a persistent form as an Extensible Markup Language (XML) document.

16. The product of claim 14, further comprising instructions to:
implement the POID object as a model for a service provider repository object that does not yet exist.

17. The product of claim 14, further comprising instructions to:
implement all client platform dependencies of the framework in the client framework; and
implement all client platform dependencies of the service provider in the service provider client.

18. The product of claim 14, further comprising instructions to:
generate dynamically by the framework all object instances of service provider objects.

19. The product of claim 14, further comprising instructions to:
instantiate all objects that are part of the framework dynamically by means of a class role, a class role being a computer programming construct that assigns to a class occupying the class role a functionality in terms of a set of interfaces, where the class role defines each interface in the set as being either mandatory or optional.

20. The product of claim 14, further comprising instructions making the framework operable to:
coordinate queries and searches over multiple service providers;
register service providers;
arrange requests between different service providers;
provide an object factory with late binding; and
provide an abstract class hierarchy for specialization through service providers.

* * * * *